(12) United States Patent
Ito et al.

(10) Patent No.: US 7,419,927 B2
(45) Date of Patent: *Sep. 2, 2008

(54) CERAMIC ELECTRONIC DEVICE AND THE PRODUCTION METHOD

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 11/212,610

(22) Filed: Aug. 29, 2005

(65) Prior Publication Data

US 2006/0046923 A1   Mar. 2, 2006

(30) Foreign Application Priority Data

Aug. 30, 2004   (JP) ............................. 2004-250895

(51) Int. Cl.
*C04B 35/468* (2006.01)
(52) U.S. Cl. ...................................... 501/139; 501/138
(58) Field of Classification Search ................. 501/137, 501/138, 139
See application file for complete search history.

(56) References Cited

U.S. PATENT DOCUMENTS

| | | | |
|---|---|---|---|
| 4,403,236 A * | 9/1983 | Mandai et al. ................. 257/43 |
| 5,225,960 A | 7/1993 | Kishi et al. | |
| 5,335,139 A | 8/1994 | Nomura et al. | |
| 5,550,092 A | 8/1996 | Chu et al. | |
| 6,226,172 B1 * | 5/2001 | Sato et al. ................... 361/311 |
| 6,344,427 B1 | 2/2002 | Komatsu et al. | |
| 6,403,513 B1 * | 6/2002 | Sato et al. .................... 501/137 |
| 6,544,916 B1 * | 4/2003 | Sato et al. .................... 501/137 |
| 6,548,437 B2 * | 4/2003 | Sato et al. .................... 501/139 |
| 6,999,302 B2 * | 2/2006 | Ito et al. .................. 361/321.2 |
| 7,061,748 B2 * | 6/2006 | Ito et al. .................. 361/321.4 |
| 7,262,146 B2 * | 8/2007 | Ito et al. ..................... 501/139 |
| 2006/0088719 A1 * | 4/2006 | Ito et al. ..................... 428/469 |

FOREIGN PATENT DOCUMENTS

| | | |
|---|---|---|
| EP | 0 726 235 A1 | 8/1996 |
| EP | 1 094 477 A2 | 4/2001 |
| EP | 1 095 917 A1 | 5/2001 |
| GB | 2 286 183 A | 8/1995 |
| JP | A-06-275459 | 9/1994 |
| JP | A 9-97734 | 4/1997 |
| JP | A 10-74666 | 3/1998 |
| JP | 2000-026161 | 1/2000 |
| JP | 2000-311828 | 11/2000 |
| JP | A-2001-220225 | 8/2001 |
| KR | 10-0206479 | 7/1999 |
| WO | WO 00/48963 | 8/2000 |

* cited by examiner

*Primary Examiner*—Karl E Group
(74) *Attorney, Agent, or Firm*—Oliff & Berridge, PLC

(57) ABSTRACT

A ceramic electronic device including a dielectric layer, wherein the dielectric layer includes a main component expressed by a composition formula of $Ba_m TiO_{2+m}$, wherein "m" satisfies $0.995 \leq m \leq 1.010$ and a ratio of Ba and Ti satisfies $0.995 \leq Ba/Ti \leq 1.010$, and a subcomponent (a sixth subcomponent) including an oxide of Al; and a content of the Al compound is 0 to 4.0 moles (note that 0 is not included) in terms of $Al_2O_3$ with respect to 100 moles of the main component; and preferably, the dielectric layer includes a segregation phase, and the segregation phase includes an oxide of Al.

3 Claims, 2 Drawing Sheets

CERAMIC ELECTRONIC DEVICE AND THE PRODUCTION METHOD

BACKGROUND OF THE INVENTION

1. Field of the Invention

The present invention relates to a ceramic electronic device, such as a multilayer ceramic capacitor, and the production method, and particularly relates to a highly reliable ceramic electronic device having a high withstand voltage and an excellent high temperature load lifetime and the production method.

2. Description of the Related Art

A multilayer ceramic capacitor is widely used as a highly reliable compact electronic device having a large capacity, and the number to be used in an electric apparatus and an electronic apparatus is also large. In recent years, as apparatuses becoming more compact with higher performance, demands for a multilayer ceramic capacitor to be more compact, larger in capacity, lower in price, and higher in reliability have increasingly become stronger.

A multilayer ceramic capacitor is normally produced by stacking an internal electrode paste and dielectric slurry (paste) by a sheet method or a printing method, etc. and firing the result. As the internal electrodes, Pd and a Pd alloy have been generally used but relatively inexpensive Ni and a Ni alloy have come into use because of a high price of Pd. When forming internal electrodes by Ni or a Ni alloy, there is a disadvantage that the electrodes are oxidized when fired in the air. Therefore, in general, after the binder is removed, dielectric layers are fired by firing under a lower oxygen partial pressure than a balancing oxygen partial pressure of Ni and NiO, then are re-oxidized by annealing.

However, firing in a reducing atmosphere results in a disadvantage that the dielectric layers are reduced and the insulation resistance (IR) becomes low. Therefore, reduction-resistant dielectric materials, which are not reduced even when fired in a reducing atmosphere have been proposed (for example, the Japanese Unexamined Patent Publication No. 9-97734 and the Japanese Unexamined Patent Publication No. 10-74666).

The Japanese Unexamined Patent Publication No. 9-97734 and the Japanese Unexamined Patent Publication No. 10-74666 disclose a dielectric layer having a segregation phase including at least two kinds of oxides of a Li oxide, Si oxide and B oxide. According to these articles, as a result that the dielectric layer includes the segregation phase as above, the moving degree of electrons moving in a grain boundary layer can be lowered and reliability under a high temperature and high voltage can be improved.

However, in the Japanese Unexamined Patent Publication No. 9-97734 and the Japanese Unexamined Patent Publication No. 10-74666, oxides included in the segregation phase were oxides of Li, Si and B, and even if a segregation phase including the oxides is formed, an effect of improving the high temperature load lifetime was insufficient. Furthermore, there was a disadvantage that a temperature characteristic of a capacitance becomes poor and, particularly, a capacity at a high temperature becomes low in these articles.

SUMMARY OF THE INVENTION

An object of the present invention is to provide a highly reliable ceramic electronic device, such as a multilayer ceramic capacitor, having a high withstand voltage and an excellent high temperature load lifetime and the production method.

To attain the above object, according to the present invention, there is provided a ceramic electronic device having a dielectric layer, wherein:

the dielectric layer includes a main component expressed by a composition formula of $Ba_m TiO_{2+m}$, wherein "m" satisfies $0.995 \leq m \leq 1.010$ and a ratio of Ba and Ti satisfies $0.995 \leq Ba/Ti \leq 1.010$, and a subcomponent (sixth subcomponent) including an oxide of Al; and a content of the oxide of Al is 0 to 4.0 moles (note that 0 is not included) in terms of $Al_2O_3$ with respect to 100 moles of the main component.

In the present invention, a content of an Al oxide as a subcomponent (sixth subcomponent) is preferably 0.5 to 2.5 moles, and more preferably 1.0 to 1.5 moles in terms of $Al_2O_3$ with respect to 100 moles of the main component. When the content of the Al oxide is too large, the average lifetime tends to deteriorate. On the other hand, when the Al oxide is not added, sinterability of the dielectric layer declines and sintering becomes difficult.

Alternately, according to the present invention, there is provided a ceramic electronic device including a dielectric layer, wherein:

the dielectric layer includes a main component expressed by a composition formula of $Ba_m TiO_{2+m}$, wherein "m" satisfies $0.995 \leq m \leq 1.010$ and a ratio of Ba and Ti satisfies $0.995 \leq Ba/Ti \leq 1.010$, and a subcomponent (sixth subcomponent) including an oxide of Al; and the dielectric layer includes a segregation phase, and the segregation phase includes an oxide of Al.

In the present invention, preferably, the dielectric layer includes a main component expressed by a composition formula of $Ba_m TiO_{2+m}$, wherein "m" satisfies $0.995 \leq m \leq 1.010$ and a ratio of Ba and Ti satisfies $0.995 \leq Ba/Ti \leq 1.010$, and a subcomponent (sixth subcomponent) including an oxide of Al;

a content of the Al compound is 0 to 4.0 moles (note that 0 is not included) in terms of $Al_2O_3$ with respect to 100 moles of the main component; and the dielectric layer includes a segregation phase, and the segregation phase includes an oxide of Al.

In the present invention, the segregation phase (secondary phase) is a part where an Al oxide and other additive subcomponents are segregated in the dielectric layer and these additive subcomponents exist at higher concentration comparing with those in a main phase composed mainly of a main component. By forming a segregation phase including an Al oxide in the dielectric layer, a withstand voltage of a ceramic electronic device, such as a multilayer ceramic capacitor, can be heightened and the high temperature load lifetime can be improved.

In the present invention, a C.V. value of a distribution of $Al_2O_3$ calculated by a formula (1) below from standard deviation $\sigma$ of detection strength and an average detection strength x of the $Al_2O_3$ distribution in the dielectric layer is preferably 100 or lower, more preferably 80 or lower, and furthermore preferably 70 or lower.

$$\text{C.V. value} = (\text{standard deviation } \sigma \text{ of detection strength/an average detection strength } x) \times 100 \quad (1)$$

The above C.V. (coefficient of variation) value is a value obtained by dividing the standard deviation $\sigma$ of the detection strength of a distribution of an element in the dielectric layer by the average detection strength x of the element distribution and indicates the dispersion degree of the element. The lower the value is, the higher the dispersion degree is. The C.V. value of the $Al_2O_3$ distribution is preferably low, that is, the dispersion degree of $Al_2O_3$ is preferably high in the present invention. Note that when the Al oxide included in the dielectric layer exists mainly in the segregation phase, the C.V. value of the distribution of the $Al_2O_3$ indicates a C.V. value of a distribution of the segregation phase.

In the present invention, the C.V. value of the $Al_2O_3$ distribution in the dielectric layer can be measured, for example, by an EPMA (electron probe micro analysis) of a section of the dielectric layer. Namely, element mapping of Al elements is performed by the EPMA, peak strength of the Al elements at each part is measured, standard deviation σ of the detection strength and average detection strength x of the Al elements in the dielectric layer are obtained from the peak strength, and the C.V. value can be calculated from the above formula.

Preferably, the dielectric layer further includes a first subcomponent including at least one kind selected from MgO, CaO, BaO and SrO;

a second subcomponent including an oxide silicon as a main component;

a third subcomponent including at least one kind selected from $V_2O_5$, $MoO_3$ and $WO_3$; and a fourth subcomponent including an oxide of R (note that R is at least one kind selected from Sc, Y, La, Ce, Pr, Nd, Pm, Sm, Eu, Gd, Tb, Dy, Ho, Er, Tm, Yb and Lu); and ratios of the respective subcomponents with respect to 100 moles of the main component are first subcomponent: 0 to 3.0 moles (note that 0 is not included)

second subcomponent: 2 to 10 moles third subcomponent 0.01 to 0.5 mole, and fourth subcomponent 0.5 to 7 moles (note that the number of moles of the fourth subcomponent is a ratio of R alone).

Preferably, the dielectric layer furthermore includes a fifth subcomponent including $CaZrO_3$ or $CaO+ZrO_2$; and a ratio of the fifth subcomponent with respect to 100 moles of the main component is 5 moles or less (note that 0 is not included).

Preferably, the ceramic electronic device is any one of the above electronic devices, wherein a change rate (ΔC) of a capacitance at −55 to +150° C. is within ±15%. Namely, the ceramic electronic device of the present invention preferably satisfies the X8R characteristic of the EIA standard.

Preferably, a thickness of the dielectric layer is 4.5 μm or thinner, and more preferably 3.5 μm or thinner. According to the present invention, the withstand voltage can be made high and the high temperature load lifetime can be also improved, so that the dielectric layer can be made thin and a highly reliable compact ceramic electronic device having a large capacity can be obtained.

According to the present invention, there is provided a production method of a ceramic electronic device including a dielectric layer, wherein:

a granular Al compound having a maximum particle diameter of in a range of 0.2 to 5.1 μm is used as a material of a subcomponent for forming the dielectric layer; and a content of the Al compound is 0 to 4.0 moles (note that 0 is not included) in terms of $Al_2O_3$ with respect to 100 moles of the main component.

In the production method of the present invention, an Al compound having the maximum particle diameter is in the predetermined range explained above is used as the granular Al compound as a material of a subcomponent (sixth subcomponent). Therefore, the dispersion state (distribution state) of the segregation phase including the Al compound in the dielectric layer can be controlled, a withstand voltage of an electronic device can be made high, and the high temperature load lifetime can be improved.

Note that the maximum particle diameter of the Al compound used in the production method of the present invention means the maximum particle diameter among "particle diameters of actual particles" measured by SEM observation, etc. Also, "particle diameters of actual particles" means, for example in the case where there is an aggregation in particles, particle diameters of respective particles composing the aggregation and does not mean a particle diameter of the aggregation itself.

Alternately, according to the present invention, there is provided a production method of a ceramic electronic device including a dielectric layer, wherein:

a granular Al compound, wherein a difference (D100–D50) of a D50 diameter of 50% equivalent diameter and a D100 diameter of 100% equivalent diameter is 67.2 μm or smaller, is used as a material of a subcomponent for forming the dielectric layer; and a content of the Al compound is 0 to 4.0 moles (note that 0 is not included) in terms of $Al_2O_3$ with respect to 100 moles of the main component.

In the production method of the present invention, as the Al compound as a material of a subcomponent (sixth subcomponent), an Al compound, wherein a difference (D100 –D50) between the D50 diameter and the D100 diameter is in the predetermined range as above, is used. Therefore, the dispersion state (distribution state) of the segregation phase including the Al compound in the dielectric layer can be controlled, a withstand voltage of an electronic device can be made high, and the high temperature load lifetime can be improved.

Note that, in the present invention, the D50 diameter and the D100 diameter mean a volume-reduced cumulative 50% diameter and volume-reduced cumulative 100% diameter and are normally measured by the laser diffraction method, etc.

In the production method of a ceramic electronic device having a dielectric layer of the present invention, preferably, a granular Al compound, wherein a difference (D100–D50) of a D50 diameter of 50% equivalent diameter and a D100 diameter of 100% equivalent diameter is 67.2 μm or smaller, is used as a material of a subcomponent for forming the dielectric layer; and a content of the Al compound is 0 to 4.0 moles (note that 0 is not included) in terms of $Al_2O_3$ with respect to 100 moles of the main component.

Note that, in the present invention, as the Al compound, oxides of Al and a variety of compounds to be the oxides of Al by firing, such as carbonate, oxalate, nitrate, hydroxide and organic metal compound, etc. may be mentioned.

In the production method of the present invention, preferably, as a material of a main component included in the dielectric layer, a material expressed by a composition formula of $Ba_m TiO_{2+m}$, wherein "m" satisfies 0.995≦m≦1.010 and a ratio of Ba and Ti satisfies 0.995≦Ba/Ti≦1.010, is used.

A ceramic electronic device according to the present invention is not particularly limited, and a multilayer ceramic capacitor, piezoelectric device, chip inductor, chip varistor, chip thermistor, chip resistor, and other surface mounted chip electronic devices (SMD) may be mentioned.

According to the present invention, a highly reliable ceramic electronic device, such as a multilayer ceramic capacitor, having a high withstand voltage and an excellent high temperature load lifetime and the production method can be provided.

BRIEF DESCRIPTION OF DRAWINGS

Below, an embodiment of the present invention will be explained based on the attached drawings, in which.

DESCRIPTION OF THE PREFERRED EMBODIMENTS

Multilayer Ceramic Capacitor 1

Figure 1:
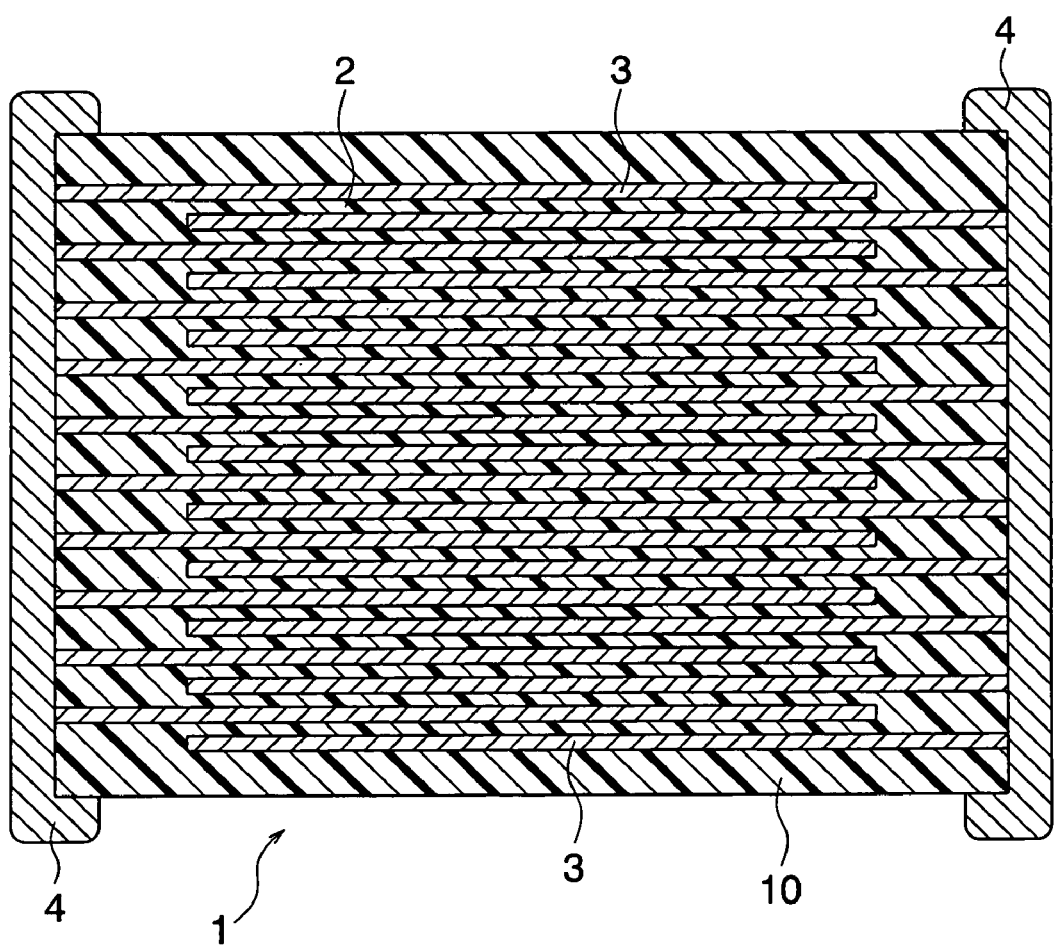
FIG. 1 is a sectional view of a multilayer ceramic capacitor according to an embodiment of the present invention.

As shown in FIG. 1, a multilayer ceramic capacitor 1 according to an embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. A shape of the capacitor element body 10 is not particularly limited, but is normally rectangular parallelepiped. Also, the size is not particularly limited and may be a suitable size in accordance with the use object.

The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

Dielectric Layer 2

The dielectric layer 2 includes a dielectric ceramic composition.

In the present embodiment, the above dielectric ceramic composition includes a main component expressed by a composition formula of $Ba_m TiO_{2+m}$, wherein "m" satisfies $0.995 \leq m \leq 1.010$ and a ratio of Ba and Ti is $0.995 \leq Ba/Ti \leq 1.010$, a sixth subcomponent including an Al oxide, and other subcomponents.

A content of the Al oxide as the sixth subcomponent is 0 to 4.0 moles (note that 0 is not included) in terms of $Al_2O_3$, preferably 0.5 to 2.5 moles, and more preferably 1.0 to 1.5 mole with respect to 100 moles of the main component. The Al oxide has an effect of improving sinterability of the dielectric layers 2. When the content of the Al oxide is too much, the high temperature load lifetime tends to decline. On the other hand, when the Al oxide is not added, sinterability of the dielectric layers declines and sintering becomes difficult. Note that, in the present embodiment, the Al oxide is mainly included in a later explained segregation phase.

In the present embodiment, as other subcomponents than the sixth subcomponent including the above Al oxide, the first to fifth subcomponent below are preferably included.

Namely, it is preferable to furthermore include a first subcomponent including at least one kind selected from MgO, CaO, BaO and SrO, a second subcomponent including oxide silicon as a main component, a third subcomponent including at least one kind selected from $V_2O_5$, $MoO_3$ and $WO_3$, a fourth subcomponent including an oxide of R (note that R is at least one kind selected from Sc, Y, La, Ce, Pr, Nd, Pm, Sm, Eu, Gd, Tb, Dy, Ho, Er, Tm, Yb and Lu), and a fifth subcomponent including $CaZrO_3$ or $CaO+ZrO_2$.

Ratios of the respective subcomponents with respect to 100 moles of the main component are first subcomponent: 0 to 3.0 moles (note that 0 is not included)

second subcomponent: 2 to 10 moles third subcomponent 0.01 to 0.5 mole fourth subcomponent 0.5 to 7 moles, and fifth subcomponent: 5 moles or less (note that 0 is not included), and preferably, first subcomponent: 0.5 to 2.5 moles second subcomponent: 2 to 5 moles third subcomponent 0.1 to 0.4 mole fourth subcomponent 0.5 to 5 moles and fifth subcomponent: 3 moles or less (note that 0 is not included).

Note that the ratio of the fourth subcomponent above is not a mole ratio of an R oxide, but a mole ratio of R alone. Namely, for example, when using a Yb oxide as the fourth subcomponent, the ratio of the fourth subcomponent being 1 mole does not mean that the ratio of $Yb_2O_3$ is 1 mole, but the ratio of Yb is 1 mole.

In the present embodiment, as a result that the dielectric ceramic composition includes the above first to fifth subcomponents other than the Al oxide as the sixth subcomponent, a temperature characteristic of the capacitance can be improved and, preferably, the X8R characteristic (−55 to 150° C. and $\Delta C$=within ±15%) can be satisfied.

Note that respective oxides composing the main component and subcomponents are expressed by stoichiometric compositions, but oxidization states of the oxides may be deviated from the stoichiometric compositions. Note that each of the above ratios of the respective subcomponents is obtained by converting a metal quantity included in oxides composing the subcomponent to an oxide of the above stoichiometric composition.

The reason why contents of the subcomponents are limited is as below.

When a content of the first subcomponent (MgO, CaO, BaO and SrO) is too small, the capacity-temperature change rate becomes large. On the other hand, when the content is too large, the sinterability declines and the high temperature load lifetime tends to deteriorate. Note that the composing ratio of each oxide in the first subcomponent may be any.

The second subcomponent includes oxide silicone as a main component and it is preferably included as a composite oxide expressed by a composition formula of $(Ba, Ca)_x SiO_{2+x}$. BaO and CaO in the composition formula $(Ba, Ca)_x SiO_{2+x}$ are also included in the first subcomponent, but since a melting point of $(Ba, Ca)_x SiO_{2+x}$ as a composite oxide is low, the reactivity to the main component is preferable, so that BaO and/or CaO are added as the above composite oxide in the present invention. When a content of the second subcomponent is too small, the capacity-temperature characteristic becomes poor and the IR (insulation resistance) declines. On the other hand, when the content is too much, the high temperature load lifetime becomes insufficient and, moreover, the permittivity abruptly declines. In $(Ba, Ca)_x SiO_{2+x}$, "x" is preferably 0.8 to 1.2, and more preferably 0.9 to 1.1. When the "x" is too small, that is when $SiO_2$ is too much, it reacts with $Ba_m TiO_{2+m}$ and deteriorates the dielectric property. On the other hand, when "x" is too large, the melting point becomes high to deteriorate the sinterability, which is not preferable.

Note that the ratio of Ba and Ca in the second subcomponent may be any, and only one of them may be included.

The third subcomponent ($V_2O_5$, $MoO_3$ and $WO_3$) gives an effect of flattening the capacity-temperature characteristic at the Curie's temperature or higher and an effect of improving the high temperature load lifetime. When a content of the third subcomponent is too small, the effects become insufficient. On the other hand, when the content is too much, the IR remarkably declines. Note that composing ratio of each oxide in the third subcomponent may be any.

The fourth subcomponent (an oxide of R) gives an effect of shifting the Curie's temperature to the high temperature side and an effect of flattening the capacity-temperature characteristic. When a content of the fourth subcomponent is too small, the effects become insufficient and the capacity-temperature characteristic becomes poor. On the other hand, when the content is too large, the sinterability tends to decline. In the fourth subcomponent, a Y oxide and Yb oxide are preferable because of the superior effect of improving the characteristics and the low price.

The fifth subcomponent ($CaZrO_3$ or $CaO+ZrO_2$) has effects of shifting the Curie's temperature to the high temperature side, flattening the capacity-temperature characteristic, improving the insulation resistance (IR), improving the withstand voltage and lowering the firing temperature, etc.

The Curie's temperature (a phase transition temperature from a ferroelectric to paraelectric) of the dielectric ceramic composition of the present embodiment can be changed by selecting the composition, and 120° C. or higher is preferable and 123° C. or higher is more preferable to satisfy the X8R characteristics. Note that the Curie's temperature can be measured by differential scanning calorimetry (DSC), etc.

In the present embodiment, the dielectric layer 2 has a segregation phase including an Al oxide. The segregation phase is a part where an Al oxide and other additive subcomponents are segregated and these additive subcomponents exist at higher concentration comparing with those in a main phase composed mainly of a main component.

In the present embodiment, a C.V. value of a distribution of $Al_2O_3$ calculated by the formula (1) below from standard deviation σ of detection strength and average detection strength x of the $Al_2O_3$ distribution in the dielectric layer 2 is preferably 100 or lower, more preferably 80 or lower, and furthermore preferably 70 or lower.

$$\text{C.V. value (standard deviation σ of detection strength/average detection strength } x) \times 100 \quad (1)$$

The above C.V. value (coefficient of variation) is a value obtained by dividing the standard deviation σ of the detection strength of a distribution of $Al_2O_3$ in the dielectric layer 2 by the average detection strength x of the $Al_2O_3$ distribution and indicates the dispersion degree of $Al_2O_3$. The lower the value is, the higher the dispersion degree is. The C.V. value of the $Al_2O_3$ distribution is preferably low, that is, the dispersion degree of $Al_2O_3$ is preferably high in the present embodiment. Note that the Al oxide included in the dielectric layer 2 exists mainly in the segregation phase, so that the C.V. value of the distribution of the Al oxide indicates a C.V. value of a distribution of the segregation phase in the present embodiment.

The C.V. value of the $Al_2O_3$ distribution can be measured, for example, by an EPMA (electron probe micro analysis) of a section of the dielectric layer 2. Namely, element mapping of Al elements is performed by the EPMA, peak strength of the Al elements at each part is measured, standard deviation σ of the detection strength and average detection strength x of the Al elements in the dielectric layer 2 are obtained from the peak strength, and the C.V. value can be calculated from the above formula. Note that the lower limit of the C.V. value of the above $Al_2O_3$ distribution is not particularly limited and is normally 20 or so.

Also, the smaller a diameter of the segregation phase is, the more preferable. Particularly, the maximum diameter of the segregation phase existing in the dielectric layer 2 is preferably ½ of a thickness of the dielectric layer or smaller and, more preferably ⅓ or smaller. When the maximum diameter of the segregation phase is too large, the short-circuiting defective rate tends to decline. Note that, in the present embodiment, the maximum diameter of the segregation phase means a diameter of the segregation phase having the largest diameter among segregation phases existing n the dielectric layer 2.

Also, the ratio of the segregation phase in the dielectric layer 2 is preferably 15 volume % or lower, and more preferably 10 volume % or lower with respect to the entire dielectric layer. When the ratio of the segregation phase in the dielectric layer 2 is too large, the high temperature load lifetime tends to deteriorate.

The maximum area of the segregation phase is preferably 2.5 μm² or smaller, and more preferably 2.0 μm² or smaller. When the maximum area of the segregation phase is too large, the short-circuiting defective rate tends to decline. Note that, in the present embodiment, the maximum area of the segregation phase means an area of a segregation phase having the largest area among segregation phases existing in the dielectric layer 2.

A thickness of the dielectric layer 2 is not particularly limited, but is preferably 4.5 μm or thinner, more preferably 3.5 μm or thinner, and furthermore preferably 3.0 μm or thinner per one layer. The lower limit of the thickness is not particularly limited and is, for example, 0.5 μm or so.

The number of stacked layers of the dielectric layer 2 is not particularly limited, but is preferably 20 or more, more preferably 50 or more, and particularly preferably 100 or more. The upper limit of the number of stacked layers is not particularly limited and is, for example, 2000 or so.

Internal Electrode Layer 3

A conductive material included in the internal electrode layer 3 is not particularly limited, but since components of the dielectric layer 2 has reduction-resistance, relatively inexpensive base metals may be used. As a base metal to be used as the conductive material, Ni or a Ni alloy is preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, by not more than 0.1 wt % or so. A thickness of the internal electrode layer 3 may be suitably determined in accordance with the use object, etc., but normally 0.1 to 0.3 μm is preferable, and particularly, 0.2 to 2.0 μm or so.

External Electrode 4

A conductive material included in the external electrode 4 is not particularly limited, and inexpensive Ni, Cu and alloys of these may be used in the present invention. A thickness of the external electrode 4 may be suitably determined in accordance with the use object, etc., but normally 10 to 50 μm or so is preferable.

Production Method of Multilayer Ceramic Capacitor

A multilayer ceramic capacitor in the present embodiment is produced by preparing a green chip by a normal printing method or sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is prepared and made to be slurry to fabricate a dielectric layer paste.

The dielectric layer paste may be organic slurry obtained by kneading the dielectric ceramic composition powder with an organic vehicle or water based slurry.

As the dielectric ceramic composition powder, the above oxides, mixtures thereof, and composite oxides may be used, and also it may be suitably selected from a variety of compounds to be the above oxides, mixtures thereof, and composite oxides by firing, such as carbonate, oxalate, nitrate, hydroxide and organic metal compound, etc., and mixed for use. A content of each compound in the dielectric ceramic composition powder may be determined, so that a composition of the above dielectric ceramic composition after firing is obtained. In a state before being made to be slurry, a particle diameter of the dielectric ceramic composition powder is normally 0.1 to 1 μm or so in the average particle diameter.

In the present embodiment, as a material of the Al oxide included as the sixth subcomponent in the dielectric layer 2, a granular Al oxide having a maximum particle diameter of 0.2 to 5.1 μm, and preferably 0.7 to 3.5 μm is used. By using the granular Al oxide having a maximum particle diameter of the above predetermined ranges, a dispersion state (distribution state) of the segregation phase including the Al oxide in the dielectric layer can be controlled, the withstand voltage of the capacitor can be made high and the high temperature load lifetime can be improved.

When the maximum particle diameter of the Al oxide to be used as a subcomponent material is too small, aggregation of particles arises and it is liable that the dispersion degree declines and the withstand voltage and the high temperature load lifetime deteriorate. On the other hand, when the maximum particle diameter is too large, a size of particles themselves becomes large, so that the particles are hard to be dispersed uniformly and the withstand voltage and the high temperature load lifetime tend to deteriorate. Note that the maximum particle diameter of the Al oxide means the maximum particle diameter among "particle diameters of actual particles" measured by SEM observation, etc. in the present embodiment. Also, "particle diameters of actual particles" means, for example in the case where there is an aggregation in particles, particle diameters of respective particles composing the aggregation and does not mean a particle diameter of the aggregation itself.

Alternately, in the present embodiment, as a material of the Al oxide included as a subcomponent in the above dielectric layer 2, a granular Al oxide, wherein a difference (D100–D50) of a D50 diameter of 50% equivalent diameter and a D100 diameter of 100% equivalent diameter is 67.2 μm or smaller, and preferably 20 μm or smaller, is used. Therefore, it is possible to control the dispersion state (distribution state) of the segregation phase including the Al oxide in the dielectric layer, the withstand voltage can be made high and the high temperature load lifetime can be improved. When the difference (D100–D50) between the D50 diameter and the D100 diameter is too large, unevenness of a particle distribution becomes large, dispersion of the particles becomes difficult, and the withstand voltage and the high temperature load lifetime tend to deteriorate.

Note that the above D50 diameter and the D100 diameter respectively mean a volume-reduced cumulative 50% diameter and volume-reduced cumulative 100% diameter and are normally measured by the laser diffraction method, etc. The laser diffraction method is a measurement method using diffraction and scattering caused by irradiating a light to particles and, for example when there is an aggregation in the particles, a diameter of the aggregation is detected as the particle diameter. Therefore, even in the case where the actual particle diameters (that is, particle diameters in a not aggregated state) are small, when there are a large number of aggregations in the particles and the degree of aggregation is high, values of the D50 diameter and D100 diameter become larger comparing with the actual particle diameters. Along therewith, the difference (D100–D50) between the D50 diameter and the D100 diameter also becomes large and, in this case, the withstand voltage and the high temperature load lifetime tend to deteriorate.

Note that, in the present embodiment, the above D50 and D100 of the Al oxide to be used as a material are not particularly limited but the D50 diameter is preferably 0.3 to 10.2 μm or so and D100 diameter is preferably 1.2 to 77.4 μm or so.

Also, in the present embodiment, as a material of the Al oxide as above, it is particularly preferable to use a granular Al oxide, wherein the maximum particle diameter is in the above range and the difference (D100–D50) between the D50 diameter and the D100 diameter is in the above range. By using an Al oxide as such, the effect of the present invention can be particularly enhanced.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as a printing method and sheet method.

Also, when using water based slurry as a dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as the above internal electrode layer paste.

A content of the organic vehicle in the above pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using a printing method, the dielectric layer paste and the internal electrode layer paste are stacked and printed on a substrate, such as PET, cut to be a predetermined shape and removed from the substrate to obtain a green chip.

When using a sheet method, the dielectric layer paste is used to form a green sheet, the internal electrode layer paste is printed thereon, then, the results are stacked to obtain a green chip.

Before firing, binder removal processing is performed on the green chip. The binder removal processing condition may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder removal effect declines. While, when the oxygen partial pressure exceeds the above range, the internal electrode layer tends to be oxidized.

Also, as other binder removal conditions, the temperature rising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere when firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-7}$ to $10^{-3}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., and more preferably 1200 to 1300° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-1}$ Pa to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the high temperature load lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristic, a decline of the IR and a decline of the high temperature load lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

In the present embodiment, the dielectric layer 2 includes an Al oxide as the sixth subcomponent by 0 to 4.0 mole (note that 0 is not included) in terms of $Al_2O_3$ with respect to 100 moles of the main component. Moreover, the Al oxide forms a segregation phase, and the Al oxide is dispersed, so that the C.V. value of the $Al_2O_3$ distribution in the dielectric layer 2 becomes preferably 100 or lower. Therefore, it is possible to heighten the withstand voltage and improve the high temperature load lifetime of the multilayer ceramic capacitor 1.

Furthermore, in the present embodiment, the dielectric layer 2 includes the above first to fifth subcomponents other than the Al oxide as the sixth subcomponent. Therefore, it is possible to improve a temperature characteristic of the capacitance, and preferably the X8R characteristics can be satisfied.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, as starting materials to produce a dielectric material, a main component material ($BaTiO_3$) having an average particle diameter of 0.3 μm and the first to sixth subcomponent materials described below were prepared.

MgO (first subcomponent): 1.0 mole
$(Ba_{0.6}Ca_{0.4})SiO_3$ (second subcomponent): 3.0 moles
$V_2O_5$ (third subcomponent): 0.1 mole
$Y_2O_3$ (fourth subcomponent): 2.0 moles
$Yb_2O_3$ (fourth subcomponent): 1.75 moles
$CaZrO_3$ (fifth subcomponent): 1.5 moles
$Al_2O_3$ (sixth subcomponent): 4.0 moles The adding quantities of the above first to sixth subcomponents are numbers of moles with respect to 100 moles of $BaTiO_3$ as the main component.

Next, the main component and subcomponent materials were wet mixed by a ball mill for 16 hours and dried to obtain a dielectric material. Next, 100 parts by weight of the obtained dried dielectric material, 4.8 parts by weight of an acrylic resin, 100 parts by weight of ethyl acetate, 6 parts by weight of mineral sprit and 4 parts by weight of toluene were mixed by a ball mill to be a paste, so that a dielectric layer paste was obtained.

Note that, in the present example, as $Al_2O_3$ as a material of the sixth subcomponent, $Al_2O_3$ having a different maximum particle diameter, D50 diameter and D100 diameter as shown in Table 1 was used to produce samples 1 to 7, respectively. The maximum particle diameter of $Al_2O_3$ was obtained by measuring particle diameters by observing each $Al_2O_3$ material by a scanning electronic microscope (SEM) in a scope of 30 μm×30 μm on freely selected 10 points. Namely, a particle diameter of a particle having the largest particle diameter in the above scopes was used as the maximum particle diameter.

Also, the D50 diameter and D100 diameter of $Al_2O_3$ were obtained by measuring a volume-reduced cumulative 50% diameter and volume-reduced cumulative 100% diameter by weighing 0.1 g of the material $Al_2O_3$ with respect to 90 g of water, then, adding 10 g of a disodium hexamethylene acid 5 wt % solution and agitating by a homogenizer for 10 minutes and by using a Microtorac HRA made by Nikkiso Technica Co., Ltd. Note that, in the present example, in $Al_2O_3$ used as a material of each sample, the maximum particle diameter of actual particles obtained by the SEM observation and the D100 diameter measured by the laser diffraction method are not identical, and it is considered that it is because an aggregation exists in the $Al_2O_3$ particles.

Next, 44.6 parts by weight of Ni particles, 52 parts by weight of terpineol, 3 parts by weight of ethyl cellulose, and 0.4 parts by weight of benzotriazole were kneaded by a triple-roll to be slurry, so that an internal electrode layer paste was obtained.

By using the pastes, a multilayer ceramic capacitor 1 shown in FIG. 1 was produced as explained below.

First, by using the obtained dielectric layer paste, a green sheet was formed on a PET film, after printing the internal electrode layer paste thereon, the sheet was removed from the PET film. Next, the green sheets and protective green sheets (not printed with the internal electrode layer paste) were stacked and bonded with pressure to obtain a green chip.

Next, the green chip was cut to a predetermined size and subjected to binder removal processing, firing and annealing under the conditions below, so that a multilayer ceramic sintered body was obtained. The binder removal processing-condition was the temperature raising rate of 30° C./hour, the holding temperature of 260° C., the temperature holding time of 8 hours, and the atmosphere of in the air. The firing condition was the temperature raising rate of 200° C./hour, the holding temperature of 1240° C., the temperature holding time of 2 hours, cooling rate of 300° C./hour and the atmosphere of wet mixed gas of $N_2$ and $H_2$ (the oxygen partial pressure was $10^{-2}$ Pa). The annealing condition was the temperature raising rate of 200° C./hour, the holding temperature of 1000° C., the temperature holding time of 2 hours, cooling rate of 300° C./hour and the atmosphere of wet $N_2$ gas (the oxygen partial pressure was $10^{-1}$ Pa). Note that a wetter, wherein the water temperature was 5 to 75° C., was used to wet the atmosphere gas at the time of firing and annealing.

Next, after polishing end surfaces of the obtained multilayer ceramic sintered body by sand blasting, In—Ga was applied as external electrodes, so that samples 1 to 7 of the multilayer ceramic capacitor shown in FIG. 1 were obtained.

A size of the obtained capacitor samples was 3.2 mm ×1.6 mm×0.6 mm, the number of dielectric layers sandwiched by internal electrode layers was 4, a thickness (a thickness between layers) of one dielectric layer was 2.7 μm, and a thickness of one internal electrode layer was 1.2 μm.

Note that a method of measuring the thickness of the dielectric layer was cutting the obtained capacitor sample on a plane vertical to the internal electrodes, obtaining a SEM picture of the cut surface, then, drawing a line vertical to internal electrodes on the SEM picture, and measuring a distance from one internal electrode to an adjacent internal electrode. The measurement was made for 20 times and an average of the measured values was obtained and used as a thickness of the dielectric layer.

The withstand voltage, the high temperature load lifetime (average lifetime) and the C.V. value of $Al_2O_3$ after firing of the obtained respective capacitor samples were measured by the methods below, respectively.

Withstand Voltage

Measurement of the withstand voltage (unit is V/μm) was made by connecting each capacitor sample to a direct current power source, measuring a voltage applied between both electrodes of the capacitor sample by a voltmeter, and measuring a current flowing to the capacitor sample by an ammeter. Specifically, when a current flowing to the capacitor sample is 100 mA, a voltage applied between the electrodes of the capacitor sample was measured by a voltmeter, and the value was used as the withstand voltage. The higher the withstand voltage is, the more preferable. The results are shown in Table 1.

Average Lifetime (High Temperature Load Lifetime)

An average lifetime (high temperature load lifetime) was measured by keeping the capacitor samples in a state of being applied with a direct current voltage of 8.0 V/μm at 200° C. The measurement of the average lifetime was made on 10 capacitor samples and the evaluation was made by obtaining the average lifetime. In the present example, time from start of the application until the insulation resistance is reduced by one digit was defined as the lifetime. The longer the lifetime is, the more preferable. In the present example, it is preferably 10 hours or longer. The results are shown in Table 1.

C.V. Value of $Al_2O_3$ after Firing

First, the EPMA analysis was performed on the dielectric layers of the obtained capacitor samples, and based on the result of element mapping of Al elements, peak strength of the Al elements at each part on the analysis screen was measured. Next, standard deviation a of detection strength and average detection strength x of a distribution of the Al elements in the dielectric layers were obtained from the peak strength, and the C.V. value of $Al_2O_3$ after firing was calculated from the standard deviation σ and average detection strength x by the formula (1) below. The lower the C.V. value is, the more preferable; and it is preferably 100 or lower in the present example. The results are shown in Table 1.

$$\text{C.V. value} = (\text{standard deviation } \sigma \text{ of detection strength/average detection strength } x) \times 100 \quad (1)$$

TABLE 1

| Sample No. | | Al$_2$O$_3$ Adding Quantity mol. | Maximum Diameter [μm] | D50 [μm] | D100 [μm] | D100-D50 [μm] | Firing Temperature [°C.] | Withstand Voltage [V/μm] | Average Lifetime | CV Value of Al After Firing [%] |
|---|---|---|---|---|---|---|---|---|---|---|
| 1 | Reference Example | 4.0 | 20.0 | 76.8 | 234.1 | 157.3 | 1240 | 51 | 4.2 | 123 |
| 2 | Example | 4.0 | 5.1 | 10.2 | 77.4 | 67.2 | 1240 | 113 | 10.7 | 85.1 |
| 3 | Example | 4.0 | 3.4 | 5.6 | 24.5 | 18.9 | 1240 | 121 | 14.3 | 77.3 |
| 4 | Example | 4.0 | 2.5 | 2.3 | 5.1 | 2.8 | 1240 | 154 | 16.4 | 67.3 |
| 5 | Example | 4.0 | 1.5 | 0.7 | 2.5 | 1.8 | 1240 | 167 | 18.6 | 64.2 |
| 6 | Example | 4.0 | 0.2 | 0.3 | 1.2 | 0.9 | 1240 | 186 | 19.1 | 40.1 |
| 7 | Reference Example | 4.0 | 0.05 | 0.010 | 121.3 | 121.29 | 1240 | 75 | 5.1 | 102.1 |

Evaluation 1

Figure 2A:
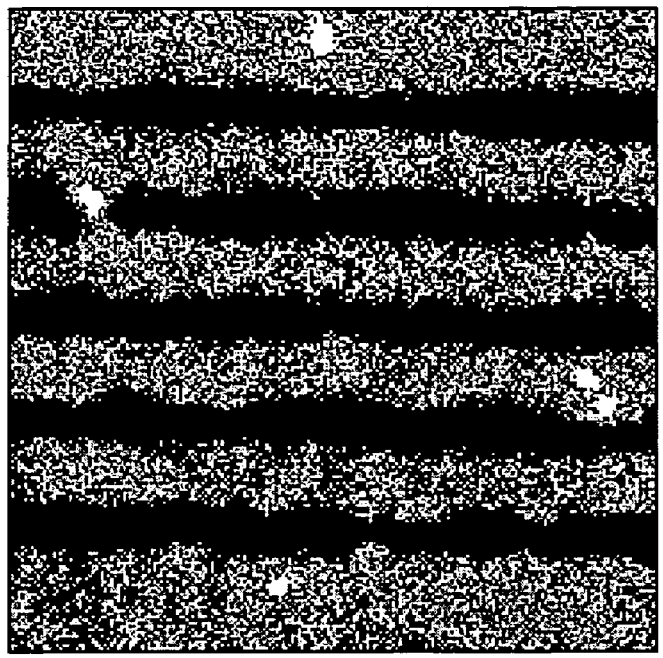
FIG. 2A is a picture showing a segregation state of $Al_2O_3$ obtained by an EPMA of the fine structure of a dielectric layer according to an example of the present invention.
Figure 2B:
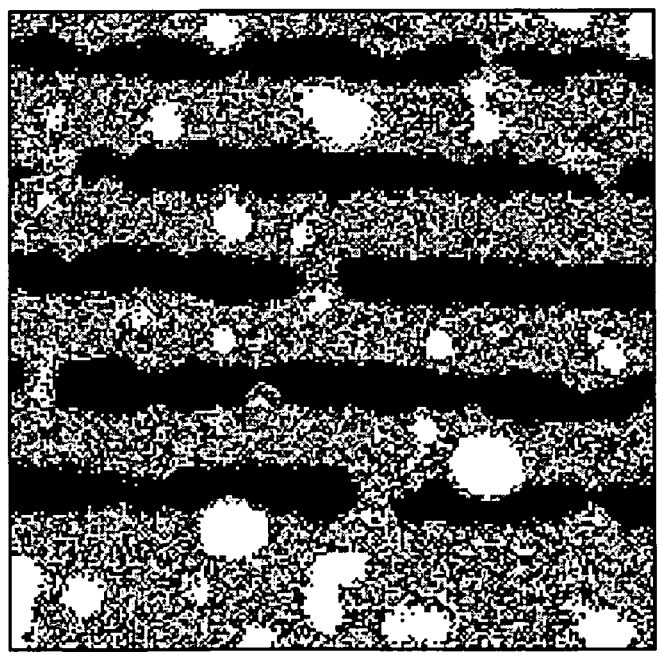
FIG. 2B is a picture showing a segregation state of $Al_2O_3$ obtained by an EPMA of the fine structure of a dielectric layer according to a reference example.

Table 1 shows adding amounts of Al$_2$O$_3$, particle diameters of used Al$_2$O$_3$, firing temperatures, withstand voltages, average lifetimes (high temperature load lifetime) and C.V. values of Al$_2$O$_3$, and FIG. 2A and FIG. 2B show pictures of segregation states of Al$_2$O$_3$ obtained by performing the EMPA analysis on fine structures of dielectric layers of samples in the example and reference example. Note that FIG. 2A is a picture of dielectric layers of the sample 4 as an example, FIG. 2B is a picture of dielectric layers of the sample 1 as a reference example, and the both are pictures of a scope of 30 μm×30 μm.

From Table 1, all of the samples 2 to 6 as examples using Al$_2$O$_3$, wherein the maximum particle diameter was 0.2 to 5.1 μm and a difference (D100–D50) between the D50 diameter and the D100 diameter was 67.2 μm or smaller, as an Al$_2$O$_3$ material in an adding quantity of 4.0 moles with respect to 100 moles of the main component exhibited a withstand voltage of 100 V/μm or higher and average lifetime of 10 hours or longer, which were preferable. Also, in all of the samples 2 to 6 as examples, the C.V. value of Al$_2$O$_3$ after firing was 100 or lower, and the dispersion degree of Al$_2$O$_3$ in the dielectric layers after sintering was confirmed to be high.

On the other hand, the samples 1 and 7 as reference examples using Al$_2$O$_3$, wherein the respective maximum particle diameters were 20.0 μm and 0.05 μm and the respective differences (D100–D50) between the D50 diameter and the D100 diameter were 157.3 μm and 121.29 μm, respectively exhibited a withstand voltage of 51 V/μm and 75 V/μm and the average lifetime of 4.2 hours and 5.1 hours. The results indicate that they are poor in the withstand voltage and average lifetime. Also, in the samples 1 and 7 as reference examples, the respective C.V. values of Al$_2$O$_3$ after sintering were 123 and 102.1, so that the dispersion degree of Al$_2$O$_3$ in the dielectric layers after sintering was confirmed to be low.

Furthermore, as is obvious from FIG. 2A and FIG. 2B, in the sample 4 as an example, the dispersion degree is high in the segregation phase including Al$_2$O$_3$, while in the sample 1 as a reference example, it is confirmed that the particle diameter is large, the dispersion degree is low and the distribution is uneven in the segregation phase including Al$_2$O$_3$.

From the results, to heighten the withstand voltage and improve the high temperature lifetime (average lifetime), it was confirmed that it is preferable to use Al$_2$O$_3$, wherein the maximum particle diameter was in a range of 0.2 to 5.1 μm and a difference (D100–D50) between the D50 diameter and the D100 diameter was 67.2 μm or smaller, as a Al$_2$O$_3$ material by a content within the range of the present invention.

Also, from the result of the sample 7 as a reference example, when the actual particle diameter of the Al$_2$O$_3$ material observed by a SEM is too small, it was confirmed that aggregation increases and the aggregation degree becomes high, so that the withstand voltage and average lifetime are liable to deteriorate.

Note that when measuring a temperature characteristic of a capacitance of the samples 2 to 6 as examples of the present invention, the result was that a change rate (ΔC) of the capacitance at −55 to +150° C. was within ±15% and the X8R characteristics of the EIA standard was satisfied.

Example 2

Other than changing an adding quantity of Al$_2$O$_3$ as a subcomponent to 1.0 mole with respect to 100 moles of the main component and the holding temperature at firing to 1260° C., samples 11 to 17 of the multilayer ceramic capacitor were produced in the same way as in the example 1, and measurement of the withstand voltage, high temperature load lifetime and C.V. value of Al$_2$O$_3$ was made in the same way as in the example 1. Note that in the samples 11 to 17 in the present example, the same Al$_2$O$_3$ as those in the samples 1 to 7 in the example 1 were used, respectively.

TABLE 2

| Sample No. | | Al$_2$O$_3$ Adding Quantity mol. | Maximum Diameter [μm] | D50 [μm] | D100 [μm] | D100-D50 [μm] | Firing Temperature [°C.] | Withstand Voltage [V/μm] | Average Lifetime | CV Value of Al After Firing [%] |
|---|---|---|---|---|---|---|---|---|---|---|
| 11 | Reference Example | 1.0 | 20.0 | 76.8 | 234.1 | 157.3 | 1260 | 80 | 6.7 | 123 |
| 12 | Example | 1.0 | 5.1 | 10.2 | 77.4 | 67.2 | 1260 | 134 | 12.3 | 67.1 |
| 13 | Example | 1.0 | 3.4 | 5.6 | 24.5 | 18.9 | 1260 | 156 | 16.8 | 50.1 |
| 14 | Example | 1.0 | 2.5 | 2.3 | 5.1 | 2.8 | 1260 | 178 | 19.1 | 48.1 |

TABLE 2-continued

| Sample No. | | Al₂O₃ Adding Quantity mol. | Maximum Diameter [μm] | D50 [μm] | D100 [μm] | D100-D50 [μm] | Firing Temperature [° C.] | Withstand Voltage [V/μm] | Average Lifetime | CV Value of Al After Firing [%] |
|---|---|---|---|---|---|---|---|---|---|---|
| 15 | Example | 1.0 | 1.5 | 0.7 | 2.5 | 1.8 | 1260 | 193 | 23.1 | 42.7 |
| 16 | Example | 1.0 | 0.2 | 0.3 | 1.2 | 0.9 | 1260 | 210 | 22.5 | 27.1 |
| 17 | Reference Example | 1.0 | 0.05 | 0.010 | 121.3 | 121.29 | 1260 | 91 | 8.7 | 103 |

Evaluation 2

Table 2 shows adding amounts of $Al_2O_3$, particle diameters of used $Al_2O_3$, firing temperatures, withstand voltage, average lifetimes (high temperature load lifetime) and C.V. values of $Al_2O_3$.

From Table 2, all of the samples 12 to 16 as examples using $Al_2O_3$, wherein the maximum particle diameter was 0.2 to 5.1 μm and a difference (D100−D50) between the D50 diameter and the D100 diameter was 67.2 μm or smaller, as a $Al_2O_3$ material in an adding quantity of 1 mole with respect to 100 moles of the main component exhibited a withstand voltage of 100 V/μm or higher and average lifetime of 10 hours or longer, which were preferable results. Also, in all of the samples 12 to 16 as examples, it was confirmed that the C.V. value of $Al_2O_3$ after sintering was 100 or lower, and the dispersion degree of $Al_2O_3$ in the dielectric layers after sintering was high.

On the other hand, the samples 11 and 17 as reference examples using $Al_2O_3$, wherein the respective maximum particle diameters were 20.0 μm and 0.05 μm and the respective differences (D100−D50) between the D50 diameter and the D100 diameter were 157.3 μm and 121.29 μm, respectively exhibited a withstand voltage of 80 V/μm and 91 V/μm and the average lifetime of 6.7 hours and 8.7 hours. The results indicate that the withstand voltage and average lifetime were poor. Also, in the samples 11 and 17 as reference examples, the respective C.V. values of $Al_2O_3$ after sintering were 123 and 103, so that the dispersion degree of $Al_2O_3$ in the dielectric layers after sintering was confirmed to be low.

From the results, also in the present example, wherein an adding quantity of $Al_2O_3$ was 1.0 mole with respect to 100 moles of the main component, the tendency became as same as that in the example 1, and it was confirmed that the $Al_2O_3$ adding quantity was preferably 0 to 4.0 moles (note that 0 was not included) in the present invention.

Also, in the same way as the example 1, when measuring a temperature characteristic of a capacitance of the samples 12 to 16 as examples of the present invention, a change rate (ΔC) of a capacitance at −55 to +150° C. was within ±15% and the X8R characteristics of the EIA standard were satisfied.

Comparative Example 1

Other than changing an adding quantity of $Al_2O_3$ as a subcomponent to 5.0 moles with respect to 100 moles of the main component and the holding temperature at firing to 1220° C., samples 21 to 27 of the multilayer ceramic capacitor were produced in the same way as in the example 1, and measurement of the withstand voltage, high temperature load lifetime and C.V. value of $Al_2O_3$ was made in the same way as in the example 1. Note that in the samples 21 to 27 in the present example, the same $Al_2O_3$ as those in the samples 1 to 7 in the example 1 were used, respectively.

TABLE 3

| Sample No. | | Al₂O₃ Adding Quantity mol. | Maximum Diameter [μm] | D50 [μm] | D100 [μm] | D100-D50 [μm] | Firing Temperature [° C.] | Withstand Voltage [V/μm] | Average Lifetime | CV Value of Al After Firing [%] |
|---|---|---|---|---|---|---|---|---|---|---|
| 21 | Comparative Example | 5.0 | 20.0 | 76.8 | 234.1 | 157.3 | 1220 | 23 | 0.3 | 176 |
| 22 | Example | 5.0 | 5.1 | 10.2 | 77.4 | 67.2 | 1220 | 76 | 1.3 | 156 |
| 23 | Example | 5.0 | 3.4 | 5.6 | 24.5 | 18.9 | 1220 | 87 | 3.5 | 132 |
| 24 | Example | 5.0 | 2.5 | 2.3 | 5.1 | 2.8 | 1220 | 90 | 5.6 | 112 |
| 25 | Example | 5.0 | 1.5 | 0.7 | 2.5 | 1.8 | 1220 | 110 | 6.7 | 107 |
| 26 | Example | 5.0 | 0.2 | 0.3 | 1.2 | 0.9 | 1220 | 123 | 7.8 | 101 |
| 27 | Comparative Example | 5.0 | 0.05 | 0.010 | 121.3 | 121.29 | 1220 | 34 | 5 | 136 |

Evaluation 3

Table 3 shows adding amounts of $Al_2O_3$, particle diameters of used $Al_2O_3$, firing temperatures, withstand voltages, average lifetimes (high temperature load lifetime) and C.V. values of $Al_2O_3$.

From Table 3, the samples 21 to 27, wherein an adding quantity of $Al_2O_3$ was 5.0 moles with respect to 100 moles of the main component, exhibited an average lifetime of shorter than 10 hours, which was poor. Furthermore, in the samples 21 to 24 and 27, the results were that the withstand voltage was also lower than 100 V/μm, so that not only the average lifetime but the withstand voltage was also inferior. Also, in all of the samples 21 to 27 as comparative examples, a C.V.

value of $Al_2O_3$ after firing exceeded 100 and the dispersion degree of $Al_2O_3$ in the dielectric layers after firing was confirmed to be low.

What is claimed is:

1. A ceramic electronic device having a dielectric layer, wherein:
    said dielectric layer includes as its main component, a component expressed by a composition formula of $Ba_m TiO_2+m$, wherein "m" satisfies $0.995 \leq m \leq 1.010$ and a ratio of Ba and Ti satisfies $0.995 \leq Ba/Ti \leq 1.010$, and a subcomponent including an oxide of Al;
    said dielectric layer includes a segregation phase, and said segregation phase includes an oxide of Al;
    a content of said oxide of Al is 4.0 moles or less, but more than zero moles in terms of $Al_2O_3$ with respect to 100 moles of said maincomponent; and
    a C.V. value of a distribution of $Al_2O_3$ calculated by a formula (1) below from standard deviation σ of detection strength and an average detection strength x of the $Al_2O_3$ distribution in said dielectric layer is 100 or lower; wherein
    the formula (1) for C.V. value is (standard deviation σ of detection strength/an average detection strength x)×100;
    said dielectric layer further includes
        a first subcomponent including at least one compound selected from MgO, CaO, BaO, and SrO;
        a second subcomponent including an oxide silicon as a main component;
        a third subcomponent including at least one compound selected from $V_2O_5$, $MoO_3$ and $WO_3$; and
        a fourth subcomponent including an oxide of R, wherein R is at least one element selected from Sc, Y, La, Ce, Pr, Nd, Pm, Sm, Eu, Gd, Tb, Dy, Ho, Er, Tm, Yb and Lu; and
    ratios of the respective subcomponents with respect to 100 moles of said main component are
        first subcomponent: more than 0 to 3.0 moles
        second subcomponent: 2 to 10 moles
        third subcomponent 0.01 to 0.5 mole, and
        fourth subcomponent 0.5 to 7 moles, wherein
        the number of moles of the fourth subcomponent is a ratio of R alone.

2. The ceramic electronic device as set forth in claim 1, wherein:
    said dielectric layer furthermore includes a fifth subcomponent including $CaZrO_3$ or $CaO+ZrO_2$; and
    a ratio of the fifth subcomponent with respect to 100 moles of said main component is 5 moles or less, but more than zero moles.

3. The ceramic electronic device as set forth in claim 1, wherein a change rate (ΔC) of a capacitance at −55 to +150° C. is within ±15%.

* * * * *